US012672021B2

(12) United States Patent
Mantha et al.

(10) Patent No.: US 12,672,021 B2
(45) Date of Patent: Jun. 30, 2026

(54) METHODS FOR EFFICIENT OVERLOAD PROTECTION IN 5G CORE NETWORKS

(71) Applicant: F5, Inc., Seattle, WA (US)

(72) Inventors: Ravi Sankar Mantha, Bangalore (IN);
Sandeep Dasgupta, Bangalore (IN)

(73) Assignee: F5, Inc., Seattle, WA (US)

( * ) Notice: Subject to any disclaimer, the term of this patent is extended or adjusted under 35 U.S.C. 154(b) by 90 days.

(21) Appl. No.: 18/799,763

(22) Filed: Aug. 9, 2024

(65) Prior Publication Data

US 2025/0358667 A1     Nov. 20, 2025

Related U.S. Application Data

(60) Provisional application No. 63/531,669, filed on Aug. 9, 2023.

(51) Int. Cl.
*H04L 43/0876*          (2022.01)
*H04L 43/0882*          (2022.01)
(Continued)

(52) U.S. Cl.
CPC ..... *H04W 28/0215* (2013.01); *H04L 43/0876* (2013.01); *H04L 43/0882* (2013.01); *H04L 47/11* (2013.01); *H04L 43/20* (2022.05)

(58) Field of Classification Search
None
See application file for complete search history.

(56) References Cited

U.S. PATENT DOCUMENTS

| 4,783,828 | A  | 11/1988 | Sadjadi |
| 6,537,488 | B1 | 3/2003  | Okumura |
|           |    | (Continued) | |

FOREIGN PATENT DOCUMENTS

| CN  | 109 391 600 A   | 2/2019  |
| CN  | 110 365 712 A   | 10/2019 |
| WO  | WO 02/35860 A1  | 5/2002  |

OTHER PUBLICATIONS

BIG-1P® Analytics: Implementations, version 11.3, Nov. 15, 2012, F5 Networks, Inc., pp. 1-40.

(Continued)

*Primary Examiner* — Joshua Joo
(74) *Attorney, Agent, or Firm* — Troutman Pepper Locke LLP

(57)                    ABSTRACT

Methods, non-transitory computer readable media, network traffic management devices and network traffic management systems that provide for efficient overload protection in 5G core networks are illustrated. With this technology, a load at a producer network function (NF) is monitored and in response to determining that the producer NF is overloaded, a plurality of types of network traffic flowing to the overloaded producer NF are monitored. An overloaded network traffic type is identified, which is a type of network traffic flowing to the producer NF that is of an amount that exceeds a first threshold amount above a first baseline amount of network traffic. An overloaded session is identified, which is a session having an amount of the overloaded network traffic type that exceeds a second threshold amount above a second baseline amount of network traffic. A mitigating action to reduce network traffic from the overloaded session is performed.

20 Claims, 8 Drawing Sheets

(51) Int. Cl.
  *H04L 47/11*      (2022.01)
  *H04W 28/02*     (2009.01)
  *H04L 43/20*      (2022.01)

(56)              References Cited

U.S. PATENT DOCUMENTS

|  |  |  |  |  |
|---|---|---|---|---|
| 6,748,056 | B1 | 6/2004 | Capriotti | |
| 6,769,066 | B1 | 7/2004 | Botros | |
| 7,228,412 | B2 | 6/2007 | Freed | |
| 7,406,606 | B2 | 7/2008 | Chawla | |
| 7,441,429 | B1 | 10/2008 | Nucci | |
| 7,519,834 | B1 | 4/2009 | Dondeti | |
| 7,568,224 | B1 | 7/2009 | Jennings | |
| 7,624,447 | B1 | 11/2009 | Horowitz | |
| 7,743,415 | B2 | 6/2010 | Poletto | |
| 8,118,893 | B2 | 2/2012 | Rosenzweig | |
| 8,572,733 | B1 | 10/2013 | Rockwood | |
| 8,578,482 | B1 | 11/2013 | Yang | |
| 8,756,684 | B2 | 6/2014 | Frantz | |
| 8,886,620 | B1 | 11/2014 | Mukerji | |
| 8,943,588 | B1 | 1/2015 | Speegle | |
| 9,032,519 | B1 | 5/2015 | Maher | |
| 9,077,709 | B1 | 7/2015 | Dall | |
| 9,203,837 | B2 | 12/2015 | Pierson | |
| 9,578,055 | B1 | 2/2017 | Khanal | |
| 9,628,499 | B1 | 4/2017 | Yu | |
| 9,654,485 | B1 | 5/2017 | Neumann | |
| 9,900,344 | B2 | 2/2018 | Smith | |
| 9,942,250 | B2 | 4/2018 | Stiansen | |
| 9,948,629 | B2 | 4/2018 | Eisen | |
| 9,967,250 | B2 | 5/2018 | Johansson | |
| 10,050,792 | B1 | 8/2018 | Johnson | |
| 10,237,298 | B1 | 3/2019 | Nguyen | |
| 10,397,250 | B1 | 8/2019 | Shemesh | |
| 10,693,901 | B1 | 6/2020 | Chan | |
| 11,228,609 | B1 | 1/2022 | Finkelshtein | |
| 11,246,053 | B2 * | 2/2022 | Zhou | H04W 4/08 |
| 11,336,575 | B1 | 5/2022 | Milley et al. | |
| 11,968,226 | B1 | 4/2024 | Chychi | |
| 2002/0116615 | A1 | 8/2002 | Nguyen | |
| 2003/0042439 | A1 | 3/2003 | Rusu | |
| 2003/0073091 | A1 | 4/2003 | Krylov | |
| 2003/0145232 | A1 | 7/2003 | Poletto | |
| 2003/0199762 | A1 | 10/2003 | Fritz | |
| 2004/0037326 | A1 | 2/2004 | D'Souza | |
| 2004/0103283 | A1 | 5/2004 | Hornak | |
| 2004/0170123 | A1 | 9/2004 | Carpenter | |
| 2005/0027846 | A1 | 2/2005 | Wolfe | |
| 2005/0111367 | A1 | 5/2005 | Jonathan Chao | |
| 2005/0195840 | A1 | 9/2005 | Krapp | |
| 2005/0198519 | A1 | 9/2005 | Tamura | |
| 2006/0031483 | A1 | 2/2006 | Lund | |
| 2006/0031928 | A1 | 2/2006 | Conley | |
| 2006/0218302 | A1 * | 9/2006 | Chia | H04L 47/2441 |
| | | | | 370/230.1 |
| 2007/0014276 | A1 | 1/2007 | Bettink | |
| 2007/0118894 | A1 | 5/2007 | Bhatia | |
| 2007/0280114 | A1 | 12/2007 | Chao | |
| 2007/0294187 | A1 | 12/2007 | Scherrer | |
| 2008/0028467 | A1 | 1/2008 | Kommareddy | |
| 2008/0263215 | A1 | 10/2008 | Schnellbaecher | |
| 2008/0320567 | A1 | 12/2008 | Shulman | |
| 2009/0024737 | A1 | 1/2009 | Goldspink | |
| 2009/0199297 | A1 | 8/2009 | Jarrett | |
| 2010/0031315 | A1 | 2/2010 | Feng | |
| 2010/0070451 | A1 | 3/2010 | Hugues | |
| 2010/0284282 | A1 | 11/2010 | Golic | |
| 2010/0325418 | A1 | 12/2010 | Kanekar | |
| 2011/0012586 | A1 | 1/2011 | Montanari | |
| 2011/0072516 | A1 | 3/2011 | Cohen | |
| 2011/0103557 | A1 * | 5/2011 | Shah | G06F 9/5083 |
| | | | | 455/466 |
| 2011/0154026 | A1 | 6/2011 | Edstrom | |
| 2011/0264905 | A1 | 10/2011 | Ovsiannikov | |
| 2012/0051236 | A1 | 3/2012 | Hegde | |

|  |  |  |  |  |
|---|---|---|---|---|
| 2012/0079592 | A1 | 3/2012 | Pandrangi | |
| 2012/0117239 | A1 | 5/2012 | Holloway | |
| 2012/0144487 | A1 | 6/2012 | Kim | |
| 2012/0167210 | A1 | 6/2012 | Oro Garcia | |
| 2012/0173710 | A1 | 7/2012 | Rodriguez | |
| 2012/0227106 | A1 | 9/2012 | Shulman | |
| 2012/0323700 | A1 | 12/2012 | Aleksandrovich | |
| 2013/0080407 | A1 | 3/2013 | Levow | |
| 2013/0263268 | A1 | 10/2013 | Kim | |
| 2013/0276114 | A1 | 10/2013 | Friedrichs | |
| 2013/0305365 | A1 | 11/2013 | Rubin | |
| 2014/0095865 | A1 | 4/2014 | Yerra | |
| 2014/0283030 | A1 * | 9/2014 | Moore | H04L 63/0227 |
| | | | | 726/22 |
| 2014/0289854 | A1 | 9/2014 | Mahvi | |
| 2014/0298419 | A1 | 10/2014 | Boubez | |
| 2014/0310805 | A1 | 10/2014 | Kandekar | |
| 2014/0317739 | A1 | 10/2014 | Be'ery | |
| 2015/0067328 | A1 | 3/2015 | Yin | |
| 2015/0088662 | A1 | 3/2015 | Noller | |
| 2015/0089080 | A1 * | 3/2015 | Alsup | H04L 49/90 |
| | | | | 709/235 |
| 2015/0095485 | A1 * | 4/2015 | Alatorre | H04L 47/125 |
| | | | | 709/224 |
| 2015/0163234 | A1 | 6/2015 | Tal | |
| 2015/0215334 | A1 | 7/2015 | Bingham | |
| 2015/0245238 | A1 * | 8/2015 | Zhang | H04W 28/0247 |
| | | | | 370/230 |
| 2015/0271179 | A1 | 9/2015 | Wang | |
| 2015/0295945 | A1 | 10/2015 | Canzanese, Jr. | |
| 2015/0310196 | A1 | 10/2015 | Turgeman | |
| 2016/0021084 | A1 | 1/2016 | Eisen | |
| 2016/0021117 | A1 | 1/2016 | Harmon | |
| 2016/0080275 | A1 * | 3/2016 | Kumaresh | H04L 47/24 |
| | | | | 709/224 |
| 2016/0127406 | A1 | 5/2016 | Smith | |
| 2016/0182542 | A1 | 6/2016 | Staniford | |
| 2016/0337314 | A1 | 11/2016 | Yu | |
| 2017/0171231 | A1 | 6/2017 | Reybok, Jr. | |
| 2017/0249306 | A1 | 8/2017 | Allen | |
| 2017/0318053 | A1 | 11/2017 | Singh | |
| 2018/0062992 | A1 * | 3/2018 | Cohn | H04L 69/22 |
| 2018/0124073 | A1 | 5/2018 | Scherman | |
| 2018/0124300 | A1 | 5/2018 | Brook | |
| 2018/0139228 | A1 | 5/2018 | Kanakarajan | |
| 2018/0165457 | A1 | 6/2018 | Holz | |
| 2019/0274089 | A1 * | 9/2019 | Castmo | H04W 48/06 |
| 2020/0296125 | A1 | 9/2020 | Alderson | |
| 2020/0351244 | A1 | 11/2020 | Moore | |
| 2021/0075790 | A1 | 3/2021 | Hebert | |
| 2022/0029901 | A1 * | 1/2022 | Varnavas | H04L 43/16 |
| 2022/0121362 | A1 | 4/2022 | Liu et al. | |
| 2023/0126426 | A1 * | 4/2023 | Moore | H04L 63/0236 |
| | | | | 726/22 |
| 2023/0146962 | A1 | 5/2023 | Reddy et al. | |
| 2023/0362192 | A1 | 11/2023 | Ballew | |
| 2023/0379405 | A1 | 11/2023 | Chhabra | |
| 2023/0394138 | A1 | 12/2023 | Noeth | |
| 2023/0421478 | A1 | 12/2023 | Chhabra | |
| 2024/0073244 | A1 | 2/2024 | Duan | |
| 2024/0073249 | A1 | 2/2024 | Cirella Filho | |
| 2024/0163094 | A1 | 5/2024 | Karas | |
| 2024/0171484 | A1 | 5/2024 | Munoz De La Torre Alonso | |
| 2024/0214416 | A1 | 6/2024 | Tracy | |
| 2024/0236002 | A1 | 7/2024 | Huson | |
| 2024/0265057 | A1 | 8/2024 | Kol | |
| 2024/0283674 | A1 | 8/2024 | Kanda | |
| 2024/0291744 | A1 | 8/2024 | Chhabra | |
| 2024/0291745 | A1 | 8/2024 | Chhabra | |
| 2025/0007835 | A1 | 1/2025 | Chhabra | |
| 2025/0007937 | A1 | 1/2025 | Mittal | |
| 2025/0039143 | A1 | 1/2025 | Parla | |
| 2025/0097100 | A1 | 3/2025 | Raja | |
| 2025/0106254 | A1 | 3/2025 | Clark | |
| 2025/0106634 | A1 | 3/2025 | Sankar Mantha | |
| 2025/0126141 | A1 | 4/2025 | Uthaman | |
| 2025/0148034 | A1 | 5/2025 | Shribman | |
| 2025/0159039 | A1 | 5/2025 | Shribman | |
| 2025/0168470 | A1 | 5/2025 | Pansare | |

(56) References Cited

U.S. PATENT DOCUMENTS

| | | |
|---|---|---|
| 2025/0175556 A1 | 5/2025 | Meredith |
| 2025/0181420 A1 | 6/2025 | Talavera |
| 2025/0193681 A1 | 6/2025 | Pandit |
| 2025/0203486 A1 | 6/2025 | Karampatsis |

OTHER PUBLICATIONS

F5 Networks, "BIG-1 P Local Traffic Manager: Concepts", version 11-4, pp. 1-178, retrieved from https://support.f5_t;omkb/en-us/products/bigipltm/manuals/producl/Itm-concepts-11-4-0 .html on Feb. 12, 2015.

F5 Networks, "BIG-1P Local Traffic Manager: Implementations", version 11.4, pp. 1-234, retrieved from https://support.5 .com/kb/en-us/products/bigipltm/manuals/producl/Itm-implementations-11-4-0 .html on Feb. 12, 2015.

F5 Networks, "BIG-1 P Local Traffic Manager: Monitors Reference", version 11.4, pp. 1-106, retrieved from hllps://support.f5 .com/kb/en-us/products/big-ip Itm/manuals/producl/Itm-monitorsreference-11-4-0 .html on Feb. 12, 2015.

F5 Networks, "Operations Guide 1.0 F5 Local Traffic Manager and Global Traffic Manager", p. 1.144, retrieved from https://support. f5 .com/kb/en-us/products/bigipltm/manuals/producl/f5-1 tm-gtm-operations-guide-1--0 .html on ~/Dec. 2015.

F5 Networks, "Release Note: BIG-IP L TM and TMOS", version 11.4.1, pp. 1-58, retrieved from hllps://support.f5.com/Kb/en-us/products/bigipltm/releasenotes/producl/relnote-Itm-11-4-1.html on Feb. 12, 2015.

F5 Networks, Inc., "BIG-IP ASM 11.5.0", Release Notes, Apr. 12, 2016, Version 11.5.0.

F5 Networks, Inc., "BIG-IPASM", Release Notes, Jun. 13, 2016, pp. 1-18, version 11.6.1 F5 Networks, Inc.

F5 Networks, Inc., "BIG-IP® Analytics: Implementations", Manual, Jan. 31, 2014, pp. 1-50, Version 11.5.

F5 Networks, Inc., "BIG-IP® Analytics: Implementations", Manual, Aug. 25, 2014, pp. 1-62, v11.6, F5 Networks, nc.

F5 Networks, Inc., "BIG-IP® Application Security Manager TM: Getting Started", Manual, Aug. 25, 2014, pp. 1-78, version 11.6, F5 Networks, Inc.

F5 Networks, Inc., "BIG-IP® Application Security Manager TM: Implementations", Manual, Aug. 25, 2014, pp. 1-420, version 11.6, F5 Networks, Inc.

F5 Networks, Inc., "BIG-IP® Application Security ManagerTM: Implementations", Manual, Jan. 31, 2014, pp. ~-396, Version 11.5.

F5 Networks, Inc., "BIG-IP® Application Security ManagerTM:Implementations", F5 Networks, Inc., Dec. 10, U014, version 11.6, pp. 1-420.

F5 Networks, Inc., "BIG-IP® Local Traffic Management: Basics", Manual, Aug. 25, 2014, pp. 1-74, version 11.6, F5 Networks, Inc.

F5 Networks, Inc., "BIG-IP® Network Firewall: Policies and Implementations", Manual, Aug. 10, 2016, pp. H 66, , 11 .6, F5 Networks, Inc.

F5 Networks, Inc., "BIG-IP® Systems: DoS Protection and Protocol Firewall Implementations", Manual, 25- ~UG-2014, pp. 1-108, v11.6, F5 Networks, Inc.

F5 Networks, Inc., "BIG-IP®TMOS®: Concepts", Manual, Nov. 11, 2014, pp. 1-148, Version 11 _5.

F5 Networks, Inc., "BIG-IP®TMOS®: Implementations", Manual, Jan. 31, 2014, pp. 1-274, Version 11.5.

F5 Networks, Inc., "F5 BIG-IP TMOS: Operations Guide", Manual, Mar. 5, 2015, pp. 1-276 version 11.6, F5 Networks, nc.

F5 Networks, Inc., "BIG-IP Application Security Manager: Implementations", F5 Networks, Inc., Dec. 10, ~014, version 11.6, pp. 1-420.

F5 Networks, Inc., "BIG-IP® Application Security Manager™: Implementations", Manual, Nov. 10, 2017, pp. 1-348, version 13.0, F5 Networks, Inc.

European Search Report Dated Feb. 17, 2025. European Patent Appln No. 24216113.1.

International Search Report dated Mar. 25, 2024 issued in International Application No. PCT/US2023/083393.

European Search Report Date Dec. 18, 2024. European Patent Application No. 24193938.8.

BIG-IP Application Security Manager Operations Guide, F5 (Jul. 2016).

* cited by examiner

| Category | Bad actor monitoring | Action towards AMF | Action towards AMF |
|---|---|---|---|
| | | HTTP status code | ProblemDetails |
| Create Session | Per supi | 429 | Cause - NF_CONGESTION_RISK Title – "UE ERROR" Detail – "too many create requests from UE" instance – URI of the PDU session reference |
| Release Session | Per supi | 429 | Cause - NF_CONGESTION_RISK Title – "UE ERROR" Detail – "too many release requests from UE" instance – URI of the PDU session reference |
| Xn Handover | Per session per location (TAI) | 429 | Cause - NF_CONGESTION_RISK Title – "UE ERROR" Detail – "too many xn handover requests from UE" instance – URI of the PDU session reference |
| N2 Handover | Per session per location (TAI) | 429 | Cause - NF_CONGESTION_RISK Title – "UE ERROR" Detail – "too many n2 handover requests from UE" instance – URI of the PDU session reference |
| 4G<->5G Handover | Per supi per location (TAI) | 429 | Cause - NF_CONGESTION_RISK Title – "UE ERROR" Detail – "too many handover requests from UE" instance – URI of the PDU session reference |

FIG. 4A

| | | | |
|---|---|---|---|
| WLAN<->5G Handover | Per supi per location (TAI) | 429 | Cause - NF_CONGESTION_RISK Title - "UE ERROR" Detail - "too many handover requests from UE" instance - URI of the PDU session reference |
| UE requested session modify | Per session | 429 | Cause - NF_CONGESTION_RISK Title - "UE ERROR" Detail - "too many modify requests from UE" instance - URI of the PDU session reference |
| UE requested idle->active | Per session | 429 | Cause - NF_CONGESTION_RISK Title - "UE ERROR" Detail - "too many activate requests from UE" instance - URI of the PDU session reference |
| RAN requested active->idle | Per session | 429 | Cause - NF_CONGESTION_RISK Title - "RAN ERROR" Detail - "too many idle requests from RAN" instance - NA |

FIG. 4B

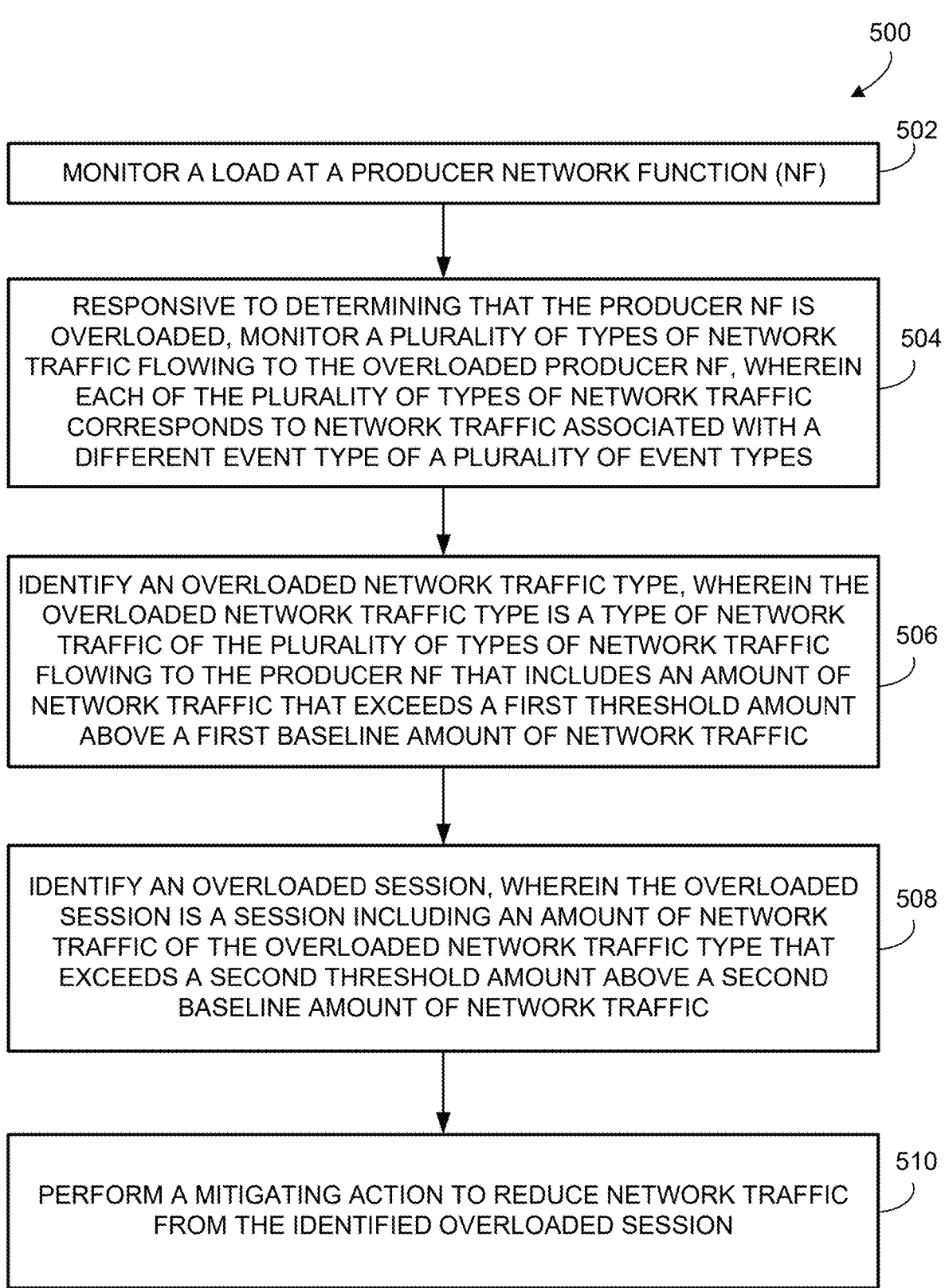

500

502

MONITOR A LOAD AT A PRODUCER NETWORK FUNCTION (NF)

504

RESPONSIVE TO DETERMINING THAT THE PRODUCER NF IS OVERLOADED, MONITOR A PLURALITY OF TYPES OF NETWORK TRAFFIC FLOWING TO THE OVERLOADED PRODUCER NF, WHEREIN EACH OF THE PLURALITY OF TYPES OF NETWORK TRAFFIC CORRESPONDS TO NETWORK TRAFFIC ASSOCIATED WITH A DIFFERENT EVENT TYPE OF A PLURALITY OF EVENT TYPES

506

IDENTIFY AN OVERLOADED NETWORK TRAFFIC TYPE, WHEREIN THE OVERLOADED NETWORK TRAFFIC TYPE IS A TYPE OF NETWORK TRAFFIC OF THE PLURALITY OF TYPES OF NETWORK TRAFFIC FLOWING TO THE PRODUCER NF THAT INCLUDES AN AMOUNT OF NETWORK TRAFFIC THAT EXCEEDS A FIRST THRESHOLD AMOUNT ABOVE A FIRST BASELINE AMOUNT OF NETWORK TRAFFIC

508

IDENTIFY AN OVERLOADED SESSION, WHEREIN THE OVERLOADED SESSION IS A SESSION INCLUDING AN AMOUNT OF NETWORK TRAFFIC OF THE OVERLOADED NETWORK TRAFFIC TYPE THAT EXCEEDS A SECOND THRESHOLD AMOUNT ABOVE A SECOND BASELINE AMOUNT OF NETWORK TRAFFIC

510

PERFORM A MITIGATING ACTION TO REDUCE NETWORK TRAFFIC FROM THE IDENTIFIED OVERLOADED SESSION

FIG. 5

METHODS FOR EFFICIENT OVERLOAD PROTECTION IN 5G CORE NETWORKS

CROSS-REFERENCE TO RELATED APPLICATION(S)

This application claims priority to U.S. Provisional Application No. 63/531,669, filed on Aug. 9, 2023, which is hereby incorporated herein by reference in its entirety.

FIELD

This technology relates to methods and systems for providing efficient overload protection within a 5G core network.

BACKGROUND 5G is a global wireless standard representing the fifth generation of cellular network technology. In contrast to 4G technology, 5G introduces the use of high band (i.e., millimeter wave) frequencies that, while more limited in range than their low and mid-band frequency counterparts, can offer much faster data transfer speeds, thereby enabling new levels of service and new technological applications. Another advantage of 5G is that it provides for network function virtualization (NFV), which decouples network functions from proprietary hardware so that network functions can run as software on standardized hardware, which makes the network more flexible by minimizing dependence on specific hardware.

Like previous mobile network generations, the 5G core network provides access to services for devices while providing service providers the functions they need to authenticate, authorize and manage their customers. However, the architecture of the 5G core network provides extended capabilities that provide advantages over previous generations. Software-defined and built with a service-based architecture (SBA), this architecture allows the 5G core to be disaggregated, cloud-native and distributed. One of the many advantages of a 5G core is that the location of network functions (NFs) can be optimally placed to ensure the greatest efficiency, highest performance and lowest latency.

5G core NF elements are usually dimensioned to work for a specific capacity. Due to network conditions, NFs can get overloaded and assert back pressure on peers to throttle requests, which can result in degraded quality of experience for end users. Such throttling conventionally occurs at a message level without an overall view of traffic patterns and is agnostic to end device behavior patterns. As a result, conventional methods of throttling traffic will typically impact many users, a majority of which are likely not the cause of the overload, thereby essentially punishing some users for other users' overuse of the network. The 3GPP defines a 5G network data analytics function (NWDAF) node for analytics, which can analyze user equipment (UE) behavior patterns and proposes some actions in view of the UE behavior, however, this approach is disadvantageous because although the NWDAF provides categorizations of abnormal UE and network behavior patterns, it does not specify how these patterns would be identified/derived. For example, 3GPP specifies possible DDOS attack as one pattern but does not specify how that can be detected. The NWDAF node described by 3GPP is further disadvantageous because it involves mitigation at different nodes (NFs) and hence requires additional implementation and processing on these nodes/NFs and as the NWDAF is an external node, there is a need to feed data to the NWDAF node for analytics and subscriptions need to be created to be notified by NWDAF, which adds more signaling overhead to the 5G core network.

Therefore, it is desirable to create a system for more providing efficient overload protection within a 5G core network that is capable of specifically targeting UE devices and related sessions that are the primary cause(s) of an overload, while avoiding throttling UE devices/sessions that are not causing the overload.

SUMMARY

A method implemented by a network traffic management system that includes monitoring a load a producer network function (NF). In response to determining that the producer NF is overloaded, a plurality of types of network traffic flowing to the overloaded producer NF are monitored. Each of the plurality of types of network traffic corresponds to network traffic associated with a different event type of a plurality of event types. An overloaded network traffic type is identified, which is a type of network traffic of the plurality of types of network traffic flowing to the producer NF that includes an amount of traffic that exceeds a first threshold amount above a first baseline amount of network traffic. An overloaded session is identified, which is a session having an amount of network traffic of the overloaded network traffic type that exceeds a second threshold amount above a second baseline amount of network traffic. A mitigating action to reduce network traffic from the identified overloaded session is performed.

A network traffic management device includes a memory including programmed instructions stored thereon and one or more processors configured to be capable of executing the stored programmed instructions to monitor a load a producer network function (NF). In response to determining that the producer NF is overloaded, a plurality of types of network traffic flowing to the overloaded producer NF are monitored. Each of the plurality of types of network traffic corresponds to network traffic associated with a different event type of a plurality of event types. An overloaded network traffic type is identified, which is a type of network traffic of the plurality of types of network traffic flowing to the producer NF that includes an amount of traffic that exceeds a first threshold amount above a first baseline amount of network traffic. An overloaded session is identified, which is a session having an amount of network traffic of the overloaded network traffic type that exceeds a second threshold amount above a second baseline amount of network traffic. A mitigating action to reduce network traffic from the identified overloaded session is performed.

A non-transitory computer readable medium having stored thereon instructions for including executable code that, when executed by one or more processors, causes the processors to monitor a load a producer network function (NF). In response to determining that the producer NF is overloaded, a plurality of types of network traffic flowing to the overloaded producer NF are monitored. Each of the plurality of types of network traffic corresponds to network traffic associated with a different event type of a plurality of event types. An overloaded network traffic type is identified, which is a type of network traffic of the plurality of types of network traffic flowing to the producer NF that includes an amount of traffic that exceeds a first threshold amount above a first baseline amount of network traffic. An overloaded session is identified, which is a session having an amount of network traffic of the overloaded network traffic type that exceeds a second threshold amount above a second baseline amount of network traffic. A mitigating action to reduce network traffic from the identified overloaded session is performed.

A network traffic management system with memory comprising programmed instructions stored thereon, and one or more processors configured to be capable of executing the stored programmed instructions to monitor a load a producer network function (NF). In response to determining that the producer NF is overloaded, a plurality of types of network traffic flowing to the overloaded producer NF are monitored. Each of the plurality of types of network traffic corresponds to network traffic associated with a different event type of a plurality of event types. An overloaded network traffic type is identified, which is a type of network traffic of the plurality of types of network traffic flowing to the producer NF that includes an amount of traffic that exceeds a first threshold amount above a first baseline amount of network traffic. An overloaded session is identified, which is a session having an amount of network traffic of the overloaded network traffic type that exceeds a second threshold amount above a second baseline amount of network traffic. A mitigating action to reduce network traffic from the identified overloaded session is performed.

This technology provides a number of advantages including providing methods, non-transitory computer readable media, network traffic management devices, and network traffic management systems that can provide efficient overload protection within a 5G core network by targeting mitigating actions to reduce network traffic to the particular sessions that are identified as being the source(s) of an overload.

BRIEF DESCRIPTION OF THE DRAWINGS

FIGS. 4A and 4B are two parts of a table of network traffic event types in accordance with embodiments of the disclosure; and FIG. 5 is a flow diagram of an exemplary method for providing efficient overload protection within a 5G core network.

DETAILED DESCRIPTION

Figure 1A:
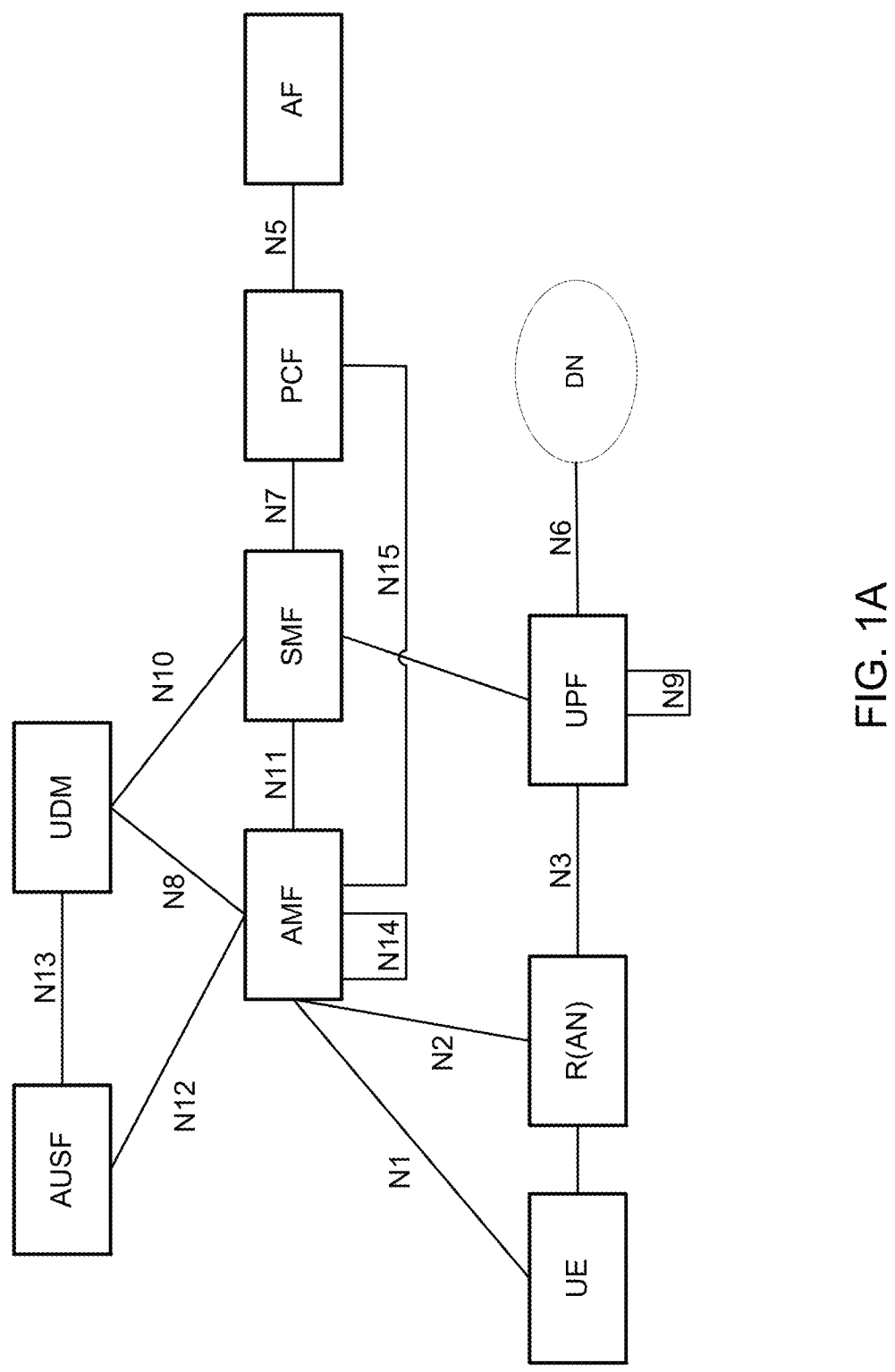
FIG. 1A is a reference point representation block diagram of an exemplary 5G system architecture.

In the following description, for the purpose of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

It will be further understood that: the term "or" may be inclusive or exclusive unless expressly stated otherwise; the term "set" may comprise zero, one, or two or more elements; the terms "first", "second", "certain", and "particular" are used as naming conventions to distinguish elements from each other and does not imply an ordering, timing, or any characteristic of the referenced items unless otherwise specified; the terms "such as", "e.g.," "for example", and the like describe one or more examples but are not limited to the described examples(s); the term "comprises" and/or "comprising" specify the presence of stated features, but do not preclude the presence or addition of one or more other features.

A "computer system" refers to one or more computers, such as one or more physical computers, virtual computers, and/or computing devices. As an example, a computer system may be, or may include, one or more server computers, cloud-based computers, cloud-based cluster of computers, virtual machine instances or virtual machine computer elements such as virtual processors, storage and memory, data centers, storage devices, desktop computers, laptop computers, mobile devices, or any other special-purpose computing devices. Any reference to a "computer system" herein may mean one or more computers, unless expressly stated otherwise. When a computer system performs an action, the action is performed by one or more computers of the computer system.

A "client," "client device," "user equipment" and/or "user equipment device" refers to a combination of integrated software components and an allocation of computational resources, such as memory, a computing device, and processes on a computing device for executing the integrated software components. The combination of the software and computational resources are configured to interact with one or more servers over a network, such as the Internet. A client may refer to either the combination of components on one or more computers, or the one or more computers. User equipment may be any device that is used directly by an end-user to communicate with a network and may include devices such as, for example, hand-held telephones, smartphones, laptop computers equipped with a mobile broadband adapter, or any other such device that is capable of connecting to a radio access network (RAN), Wi-Fi network, or any other such network.

A "server" (also referred to as a "server system" or "server computer system") refers to a combination of integrated software components and an allocation of computational resources, such as memory, a computing device, and processes on the computing device for executing the integrated software components. The combination of the software and computational resources provide a particular type of function on behalf of clients of the server. A server may refer to either the combination of components on one or more computers, or the one or more computers. A server may include multiple servers; that is, a server may include a first server computing device and a second server computing device, which may provide the same or different functionality to the same or different set of clients.

As used herein, the term "network function" (NF) may refer to a component of a network infrastructure that provides a well-defined functional behavior (e.g., routing, switching, etc.). An NF may be a functional building block within a network infrastructure, which has well-defined external interfaces and a well-defined functional behavior. NFs may be a network node, a physical appliance or a software implementation of a previously physically implemented network functionality. As used herein, NF may refer to physical network functions (PNFs), virtualized network functions (VNFs), and/or to cloud-native network functions (CNFs).

This document generally describes systems, methods, devices and other techniques for providing efficient overload protection within a 5G core network. The 5G core network is made up of various NFs that provide different functionalities. Each NF is typically dimensioned to work for a specific capacity. In other words, typically each NF is designed such that it will be able to handle an expected amount of network traffic without being overloaded. However, there may be instances where one or more UEs or other equipment operate outside of normal or expected parameters. Some such behavior may indicate a flaw in a device or in the design of the system, in which case examples of the present disclosure can provide an important function of identifying such issues and notifying system administrators of the problem. For example, a particular cell tower may have an unoptimized design such that handovers happening from UEs at this particular cell tower/location tend to cause overloads and the systems and methods described herein may be used to identify this issue so that it may be rectified. In some cases, UEs may be engaged in undesired behavior that causes overloads such as, for example, a faulty UE transitioning from an active to an idle state at an exceptionally higher rate than expected, a UE creating and deleting a session very frequently, or a UE having both Wi-Fi and 5G RAN available in the same location and is unnecessarily switching the RAN connection without mobility or other such undesirable behavior, in which case embodiments of the present disclosure may be capable of identifying particular UEs/sessions that are causing the issues and specifically throttling their network traffic without throttling innocent UEs/sessions.

The disclosed techniques may involve using a NTMD such as a service communication proxy (SCP) device that sits in between a consumer NF (e.g., AMF) and a producer NF (e.g., SMF) and monitors the load at the producer NF to determine when there is an overload. Upon determining that an overload exists, the NTMD may break the network traffic being monitored into types of traffic, where each type relates to a particular event type (e.g., create session, release session, Xn Handover, etc.) and identify one or more type(s) of traffic that are causing the overload. As will be appreciated by those of ordinary skill in the art, designers of 5G systems can establish a baseline of "normal" network traffic patterns for each type of traffic. For example, during a certain time of day, at a certain location, there is a "normal" range of handoffs that normally occur between a given minimum and maximum expected value, which can be determined using historical data. Thus, according to example embodiments, the disclosed system may be capable of determining that a particular type of network traffic is the cause of an overload because the amount of that particular type of traffic is more than a predetermined threshold level above the baseline amount of traffic for that type of network traffic. Each type of network traffic may have its own associated baselines (e.g., average traffic or maximum amount of expected traffic) and thresholds for determining the traffic type is overloaded. Upon identifying a particular type of network traffic that is overloaded (an "overloaded network traffic type"), the disclosed system may then examine all sessions that include the overloaded network traffic type and identify one or more sessions that exceed an expected amount of that traffic type on a per UE/session basis. In other words, all UE/sessions may have an expected baseline amount of that particular type of network traffic, and upon determining that for a given UE/session, the amount of network traffic of the overloaded network traffic type exceeds a predetermined threshold, the system may identify that UE/session as being a cause of the overload (an "overloaded session"). The system may identify one or more such overloaded sessions and then cause a mitigating action to be taken against each in order to reduce the amount of network traffic from these particular overloaded sessions in order to relieve the overload at the producer NF. Mitigating actions may include rate limiting individual requests of the session, rate limiting all requests of the session or rejecting all requests from the session, depending on the severity of the overload being created by the UE/session. In some embodiments, error codes and new problem details may be sent upstream to the consumer NF (e.g., simultaneously to rate limiting or rejecting messages) so that the consumer AF can take further action for these UE/sessions to optimize signaling on the consumer AF.

In this way, embodiments of the present disclosure can provide for efficient overload protection within a 5G core network that targets the specific UEs/sessions that are the primary causes of overloads while not punishing UEs/sessions that are not causing the overloads. As described herein, in addition to providing overload protection the disclosed systems and methods can also be used to diagnose issues with the system design or specific device problems that may be otherwise unknowingly causing overload issues, such that these problems can be identified and fixed. Contrary to other approaches, such as NWDAF-based approaches, the disclosed techniques advantageously provide a light weight and centralized approach that allows for the detection and identification of the type of traffic contributing to an overload, thereby making it possible to take mitigation actions only on those traffic patterns.

Figure 1B:
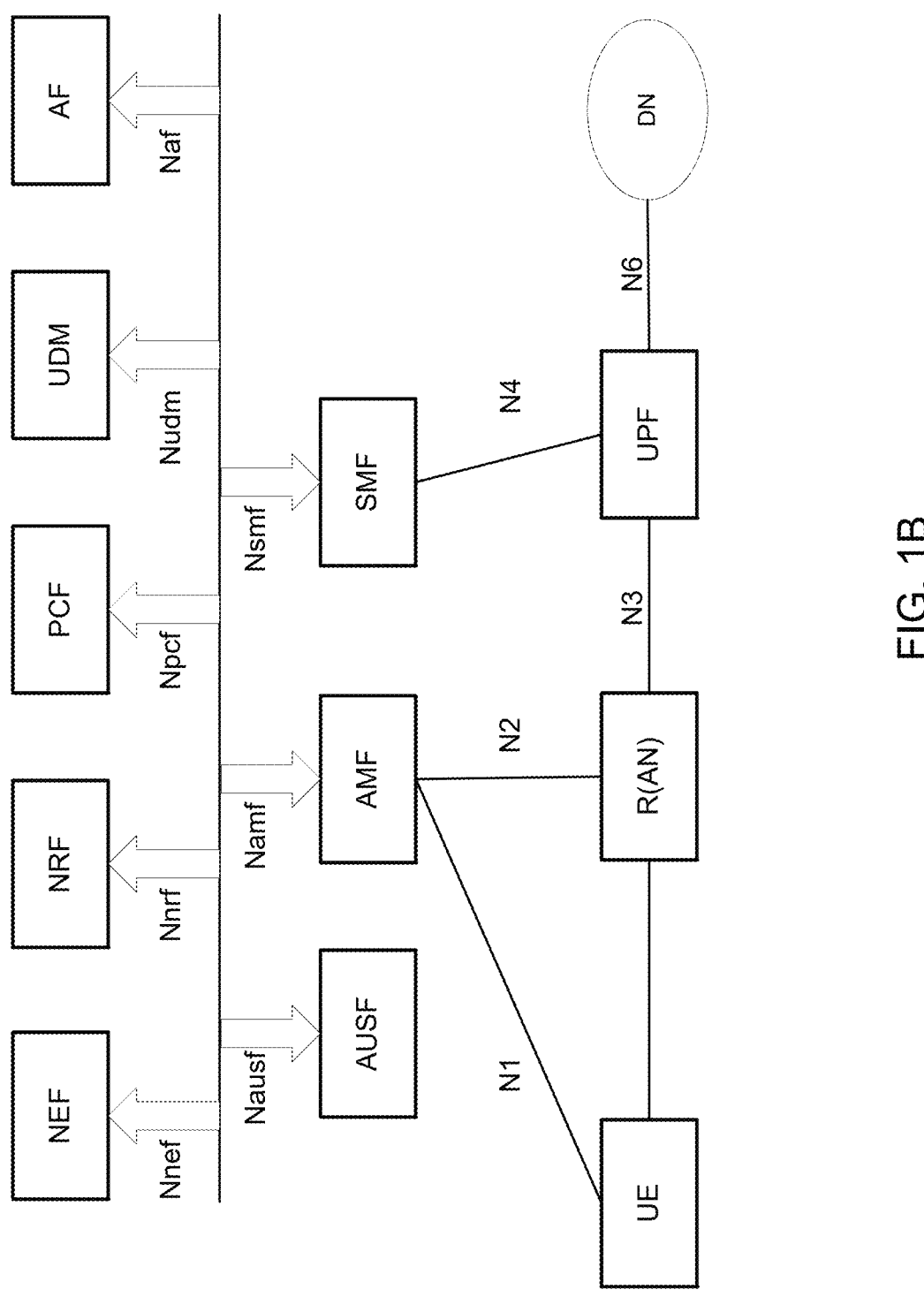
FIG. 1B is a service-based representation block diagram of an exemplary 5G system architecture.

Referring to FIGS. 1A and 1B, an exemplary reference point representation and an exemplary service-based representation of a 5G Core (5GC) network architecture is shown, as defined by the 3GPP standard. As will be understood by those of ordinary skill in the art, the reference point representation focuses on the interactions between pairs of network functions defined by point-to-point reference point (e.g., N7) between any two network functions (e.g., SMF and PCF) and is used when some interaction exists between any two network functions. Further, while the service-based representation also includes point-to-point reference points between the NFs where necessary (e.g., see lower portion of FIG. 1A), the upper portion of the figure (i.e., the 5GC Control Plane) has a "bus" and a service-based interface exhibited by individual function. This creates what is referred to as a Service Based Architecture (SBA), in which one CP network function (e.g., SMF) allows any other authorized NFs to access its services. Per the 3GPP standard, NFs within the 5GC Control Plane shall only use service-based interfaces for their instructions.

The 5G Core is made up of the following network functions: Access and Mobility Management function (AMF), Session Management function (SMF), User plane function (UPF), Policy Control Function (PCF), Authentication Server Function (AUSF), Unified Data Management (UDM), Application Function (AF), Network Exposure function (NEF), NF Repository function (NRF) and the Network Slice Selection Function (NSSF). As will be appreciated by those of ordinary skill in the art, all of these NFs are well-known and are defined by the standards organization 3GPP. Nevertheless, a brief overview of some of the functionalities of each are provided herein for reference:

The AMF may support termination of NAS signaling, NAS ciphering and integrity protection, registration management, connection management, mobility management, access authentication and authorization and security context management.

The SMF may support session management (e.g., session establishment, modification and release), UE IP address allocation and management, DHCP functions, termination of NAS signaling related to session management, DL data notification and traffic steering configuration for UPF for proper traffic routing.

The UPF may support packet routing and forwarding, packet inspection, Qos handling, acts as external PDU session point of interconnect to Data Network (DN) and is an anchor point for intra- and inter-RAT mobility.

The PCF may support unified policy framework, providing policy rules to CP functions and access subscription information for policy decisions in UDR.

The AUSF may act as an authentication server.

The UDM may support generation of Authentication and Key Agreement (AKA) credentials, user identification handling, access authorization and subscription management.

The AF may support application influence on traffic routing, accessing NEF, and interaction with policy framework for policy control.

The NEF may support exposure of capabilities and events, secure provision of information from external application to 3GPP network and translation of internal/external information.

The NRF may support service discovery function and maintains NF profile and available NF instances.

The NSSF may support selecting of the Network Slice instances to serve the UE, determining the allowed NSSAI, determining the AMF set to be used to serve the UE.

As will be understood by those of ordinary skill in the art, as further depicted in FIGS. 1A and 1B, a user equipment (UE) device (e.g., a smartphone) may access the 5G Core by connecting to a Radio Access Network (R(AN)) (e.g., a cellular network), and may ultimately access a an external Data Network (DN). The 5G architecture also may include other network devices such as routers or switches, for example, which are known in the art and thus will not be described herein.

Figure 2A:
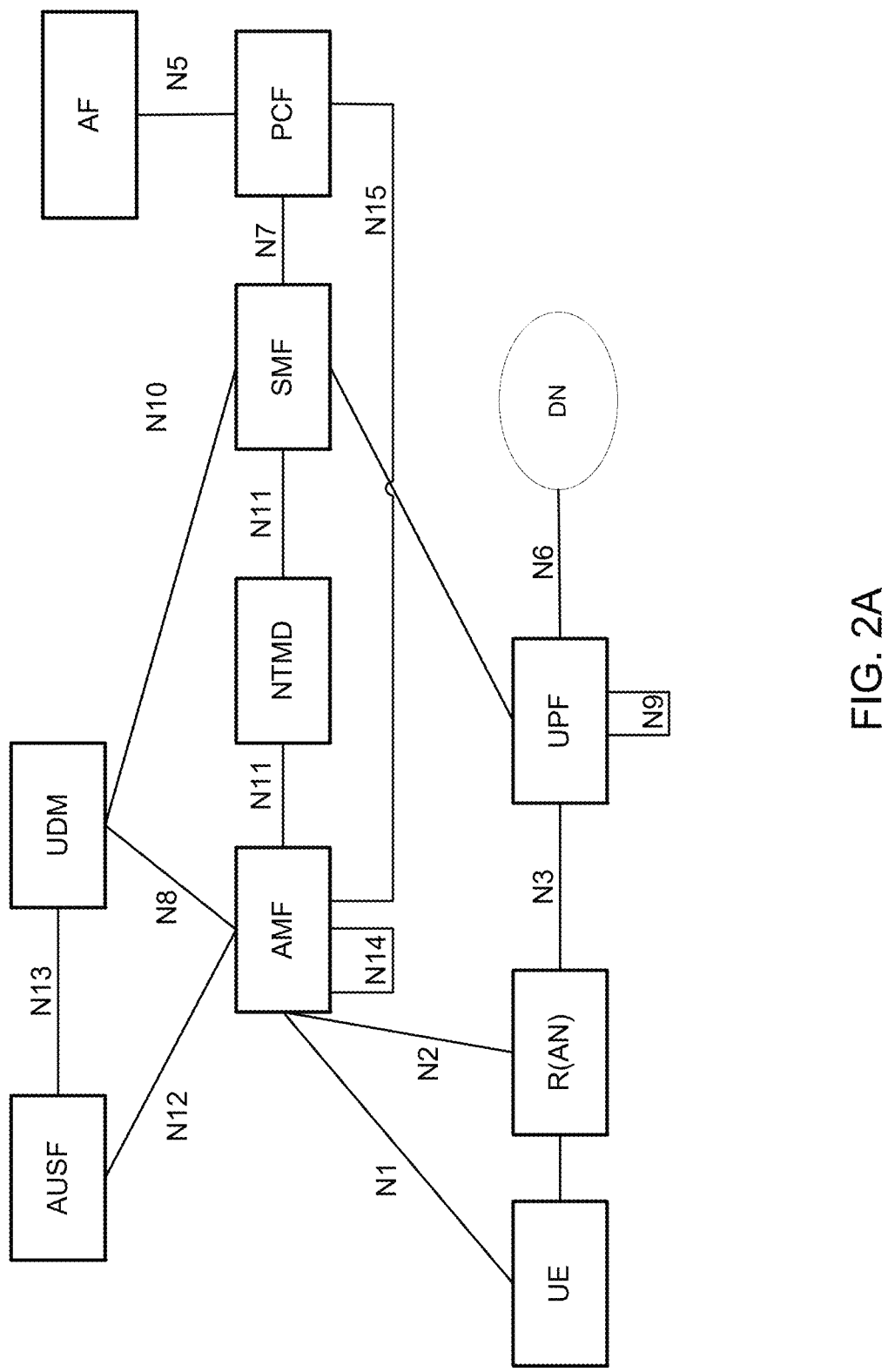
FIG. 2A is reference point representation block diagram of an exemplary 5G system architecture with a network traffic management device (NTMD) for providing efficient overload protection within a 5G core network.
Figure 2B:
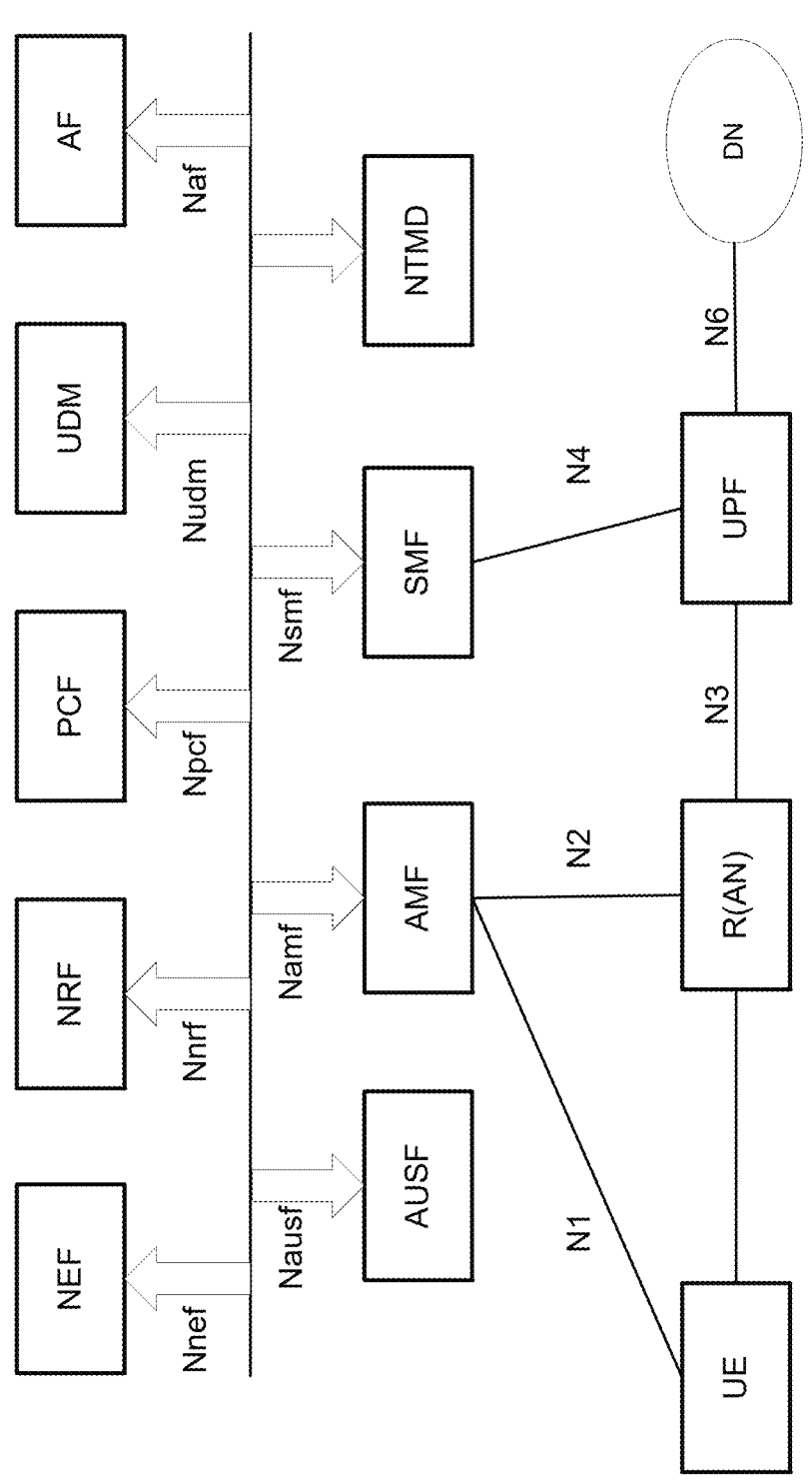
FIG. 2B is service-based representation block diagram of an exemplary 5G system architecture with an NTMD for providing efficient overload protection within a 5G core network.

Similar to FIGS. 1A and 1B, FIGS. 2A and 2B also depict a reference point representation and a service-based representation of an exemplary 5G system architecture, respectively. However, FIGS. 2A and 2B also include a NTMD in accordance with exemplary embodiments described herein. Although the NTMD is labeled as a device, it should be understood that in some embodiments the NTMD may exist as a software module on another device (e.g., a device that stores and executes multiple different software-based NFs). According to some embodiments, the NTMD may be a service communication proxy (SCP) device, as described by the 3GPP standards organization. For example, in some embodiments, the functionalities described herein may be embodied in a software update provided to an SCP that augments the functionality provided by the SCP. Further, although FIGS. 2A and 2B depict the NTMD positioned between the AMF and SMF in this example, it should be understood that in other embodiments the NTMD may be placed between any two service based interface (SBI) NFs and perform similar functionality as described herein. The NTMD may utilize different reference points or interfaces based on which NFs it is positioned between. For example, as shown in FIG. 2A, in this example the NTMD is positioned between the AMF and SMF and so although not depicted in FIG. 2B, the NTMD would utilize the Nsmf and Namf reference points as it is a proxy between the AMF and SMF.

As mentioned above, in some embodiments the NTMD may be an SCP. Conventionally, an SCP can provide various functionalities, such as indirect communication, delegated discovery, message forwarding and routing to destination NF/NF service, message forwarding and routing to a next hop SCP, communication security (e.g., authorization of the NF Service Consumer to access the NF Service Producer API), load balancing, monitoring, overload control, and other such functionalities. An SCP can optionally interact with UDR, to resolve UDM Group ID/UDR Group ID/AUSF Group ID/PSF Group ID/CHF Group ID/HSS Group ID based on UE identity, for example SUPI or IMPI/IMPU. The SCP may be deployed in a distributed manner. More than one SCP can be present in the communication path between NF Services. SCPs can be deployed at PLMN level, shared-slice level and slice-specific level. In order to enable SCPs to route message through several SCPs (i.e., next SCP hop discovery), an SCP may register its profile in the NRF. Alternatively, local configuration may be used. Load balancing, monitoring and overload control functionality provided by the SCP is left up to implementation. Thus, examples of the present disclosure may include novel enhancements to the functionality provided by a conventional SCP.

Referring to FIGS. 2A-2B, a NTMD may perform any number of functions such as providing efficient overload protection within a 5G core network as described herein. The NTMD in this example includes processor(s) 202, a memory 204, and a communication interface 206, which are coupled together by a bus, although the NTMD can include other types or numbers of elements in other configurations. Further, although the NTMD is described herein as a device, it should be understood that in some embodiments, the NTMD may be virtualized and some or all of the functionalities of NTMD described herein may be embodied in the form of software.

The processor(s) 202 of the NTMD may execute programmed instructions stored in the memory 204 of the NTMD for any number of functions described and illustrated herein. The processor(s) 202 of NTMD may include one or more central processing units (CPUs) or general purpose processors with one or more processing cores, for example, although other types of processor(s) can also be used.

The memory 204 of the NTMD stores these programmed instructions for one or more aspects of the present technology as described and illustrated herein, although some or all of the programmed instructions could be stored elsewhere. A variety of different types of memory storage devices, such as RAM, ROM, hard disk, solid state drives, flash memory, or other computer readable medium which is read from and written to by a magnetic, optical, or other reading and writing system that is coupled to the processor(s), can be used for the memory.

Figure 3:
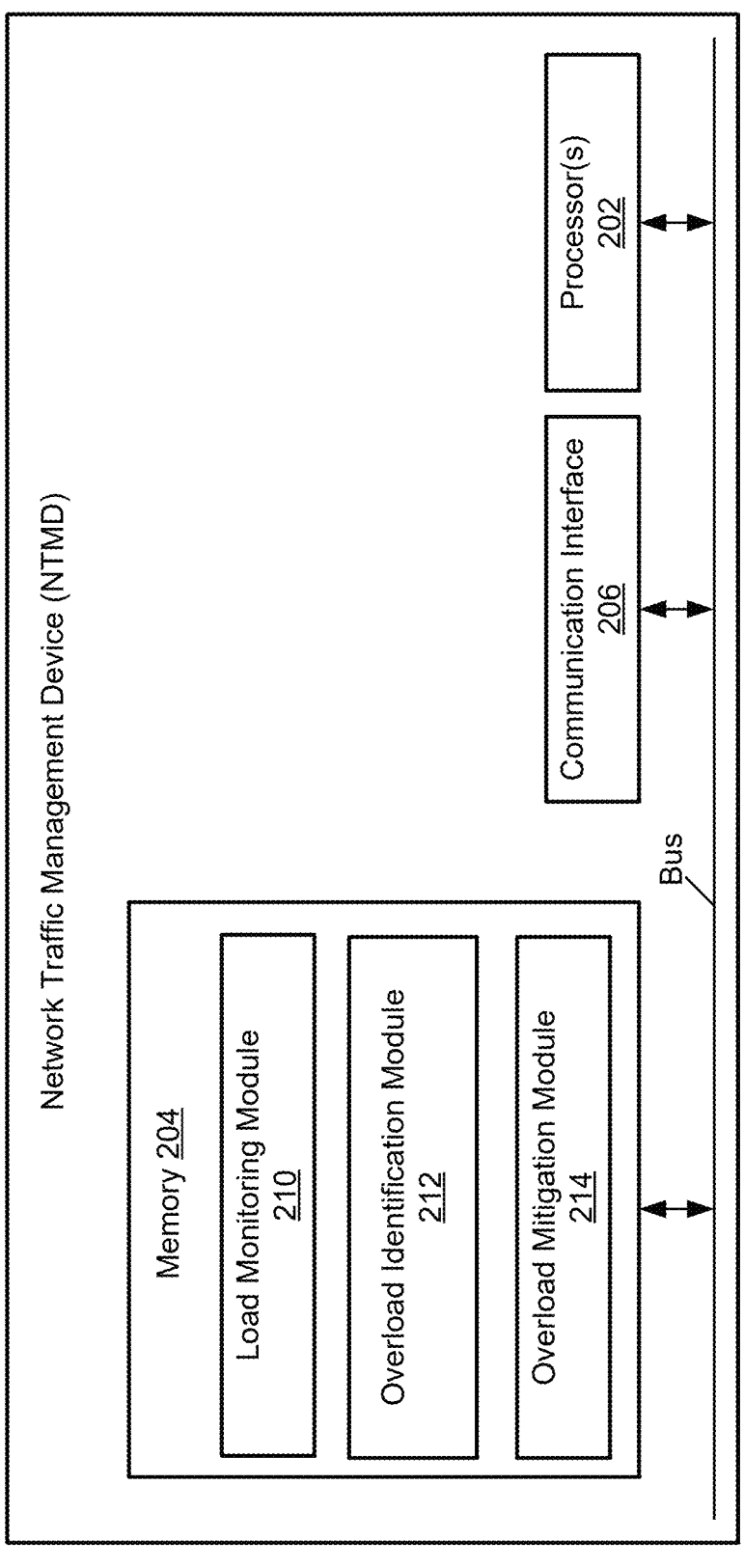
FIG. 3 is a block diagram of an exemplary network traffic management device.

Accordingly, the memory of the NTMD can store one or more modules that can include computer executable instructions that, when executed by the NTMD, cause NTMD to perform actions, such as to transmit, receive, or otherwise process network messages, for example, and to perform other actions described and illustrated below with reference to FIGS. 3-5. The modules can be implemented as components of other modules. Further, the modules can be implemented as applications, software programs, operating system extensions, plugins, or the like.

Even further, the modules may be operative in a cloud-based computing environment. The modules can be executed within or as virtual machine(s) or virtual server(s) that may be managed in a cloud-based computing environment. Also, the modules, and even the NTMD itself, may be located in virtual server(s) running in a cloud-based computing environment rather than being tied to one or more specific physical network computing devices. Also, the modules may be running in one or more VMs executing on the security server device. Additionally, in one or more examples of this technology, virtual machine(s) running on the NTMD may be managed or supervised by a hypervisor.

In this particular example, the memory of the NTMD includes a load monitoring module 210. According to some examples, the load monitoring module 210 can monitor the load at a producer NF. According to some embodiments, the load monitoring module 210 may monitor the load by receiving messages from the producer NF that report its load. In some embodiments, the load monitoring module may monitor the load at a producer NF by parsing SBA responses from the producer NFs. For example, as will be appreciated by those of ordinary skill in the art, an SBI response from a producer NF has 3gpp specific HTTP2 headers, "3gpp-sbi-lci" and "3gpp-sbi-oci", which provide the measure of load/overload on the producer NF.

In some embodiments, the NTMD may be positioned between a consumer NF and a producer NF, such that it may receive or intercept messages that are passed between the two. According to some embodiments, the NTMD may be connected to one or more consumer NFs and one or more producer NFs. Thus, in some embodiments, the load monitoring module 210 may be configured to simultaneously monitor loads of a plurality of producer NFs to which it is connected.

The memory 204 of the NTMD can also include an overload identification module 212. The overload identification module 212 may be configured identify when an overload is present at one or more producer NFs to which it is connected. According to some embodiments, the overload identification module may determine that a particular consumer NF is overloaded when its network message queue capacity is filled up beyond a predetermined threshold (e.g., 90%).

In some embodiments, the overload identification module 212 may further be configured to monitor a plurality of types of network traffic flowing to one or more producer NFs. A type of network traffic may be network traffic that is associated with a particular event type or categories of events. For example, FIGS. 4A and 4B illustrate a table showing various exemplary event types that include, for example: a create session event type, a release session event type, an Xn handover event type, an N2 handover event type, a 4G to 5G handover event type, a WLAN to 5G handover event type, a UE requested session modification event type, a UE requested idle to active event type and a radio access network (RAN) requested active to idle event type. Thus, for example, all network messages relating to a handover from 4G to 5G event may be associated with the 4G to 5G handover event type. According to some embodiments, the overload identification module may be configured to classify network messages into their respective event types based on headers and/or metadata associated with the network messages. As will be appreciated by those of ordinary skill in the art, the 3GPP standards define specific message types for different types of events, and as such, based on the message type the overload identification module may be configured to determine which type of event and therefore which type of network traffic particular messages/requests relate to, which may allow for separate monitoring of different types of network traffic. As will be appreciated, multiple pieces of information provided in a network message can be used to identify the type of message and/or event the network message relates to. For example, the API name in the HTTP2 URI header can be used along with some specific attributes in the Json payload to help identify if the message belongs to a specific event such as a 4G to 5G handover or other event type.

In some embodiments, the overload identification module may be configured to separate network traffic by event type and monitoring the amount of traffic by event type flowing to an overloaded producer NF. For example, the overload identification module may separately determine the amount of create session type of network traffic is flowing to a given producer NF, the amount of release session type of network traffic that is flowing to the producer NF, the amount of Xn handover type of network traffic that is flowing to the producer NF, and so on. Further, the overload identification module may be configured to identify one or more types of overloaded network traffic. In other words, the overload identification module may be configured to identify which traffic type(s) are experiencing a higher than normal volume, which is likely causing the overload at the producer NF. In order to determine what is higher than normal, the overload identification module may be configured to compare the amount of each type of network traffic flowing to the producer NF to a respective first baseline amount and determine if it exceeds a first predetermined threshold above the first baseline amount. As will be appreciated by those of ordinary skill in the art, a baseline amount of traffic may be a range of expected traffic of a particular type that can be determined using historical data. To determine if the amount of a particular type of traffic is abnormally high, the overload identification module may take the maximum value of the range of expected traffic (i.e., the baseline amount) and add it to a predetermined threshold and determine whether the amount of traffic exceeds the sum of the two. If it does, the overload identification module may identify that particular type of network traffic as being an "overloaded network traffic type," meaning that there is significantly more network traffic of that type than is typical flowing to the producer NF, and therefore this traffic type is a likely culprit that is contributing to the overload condition at the producer NF. Each type of network traffic may have its own baseline level of traffic as well as its own predetermined threshold for determining whether the traffic type is overloaded or not.

According to some embodiments, the overload identification module may be further configured to identify an overloaded session. An overloaded session may be an active session that is providing a flow of network requests/messages to the overloaded producer NF that includes traffic of the overloaded traffic type and that is of an amount that exceeds a second threshold amount above a second baseline amount of network traffic. In other words, as will be appreciated by those of skill in the art, for a particular session there may be a baseline level of a particular traffic type that is considered to be within a normal range (e.g., based on historical data), and the overload identification module may be configured to identify a session that is generating an abnormally high amount of a particular type of traffic (i.e., of the overloaded network traffic type) for a single session, which may be determined by comparing the amount of that type of traffic generated by the session to determine whether it exceeds a second baseline amount of network traffic plus a second threshold amount. According to some embodiments, there may be different baseline amounts of network traffic and/or different threshold amounts for each type of traffic generated in association with a particular session. If the overload identification module determines that a particular session include network traffic with the overloaded producer NF that is of the overloaded network traffic type that is of an amount that exceeds the second baseline amount plus the second threshold amount, then the NTMD may identify that session as being an overloaded session. In this way, the NTMD may identify sessions that are likely causes of the overload being experienced by the overloaded producer NF.

The memory 204 of the NTMD can also include an overload mitigation module 214, which may perform a mitigating action to reduce network traffic from the identified overloaded session. For example, in some embodiments, the NTMD may determine a list of overloaded sessions and then based on the degree of abnormally high traffic presented by each, may place each into one of a plurality of mitigation categories that have associated mitigation actions. For example, for a session placed in a first mitigation category, the NTMD may rate limit requests associated with/originating from the session. For a session placed in a second mitigation category, the NTMD may reject all requests associated with/originating from the session. For sessions placed into a third mitigation category, the NTMD may reject all messages/requests associated with/ originating from the session and send error codes to consumer NFs (e.g., in the case that the producer NF is an SMF, the NTMD may send an error message to an AMF) so that the consumer NFs can take further mitigating actions, such as for example, blocking the registration of a UE for a specified duration or sending a backoff indication to a UE to force it to delay sending the next message. Further, in some embodiments, the NTMD may identify a UE device associated with an overloaded session (e.g., based on a subscription permanent identifier (SUPI) and/or IP address contained within the network traffic associated with the session), such that network traffic from the particular UE device that is causing the overload at the overloaded producer NF may be specifically targeted for mitigation.

Although FIGS. 2A-2B only depict a single NTMD and singular NFs (e.g., AMF, SMF, etc.), it should be understood that it is contemplated that the system architecture may include many of each. For example, there may be many NTMDs that communicate with various producer NFs and consumer NFs. In some embodiments, in addition to a NTMD communicating with various producer NFs, a given producer NF may communicate with a plurality of NTMDs. Thus, according to some embodiments, multiple NTMDs may be simultaneously monitoring the load of the same producer NF and each may be independently performing the functions described herein. Thus, in some cases it may be possible for different NTMDs to be simultaneously performing mitigation actions on different sessions that are interacting with the same overloaded producer NF.

The communication interface 206 of the NTMD operatively couples and communicates between the NTMD and various other NFs, such as for example, AMF, SMF, UDM, AF, PCF, NRF, AUSF and NEF and further allows communication to UE, R(AN), UPF and DN as shown in, for example, FIG. 2B. According to some embodiments, some or all of the NFs may be executed as software on a single device that may be configured to allow communication between NFs. According to some embodiments, the communication interface 206 may be coupled to a communication network(s) that allow for communication with NFs that may be located on a separate device than the NTMD as well as other external devices such as UE, R(AN) and DN devices. According to some embodiments, the NTMD may be a separate physical device. However, in some embodiments, the enhancements disclosed herein may alternatively be embodied in a software component that may be uploaded to a device such as an SCP. In some embodiments, a similar software module may work in tandem with other devices similar to a SCP that may act as a load balancer proxy.

By way of example only, the communication network(s) can include local area network(s) (LAN(s)) or wide area network(s) (WAN(s)), and can use TCP/IP over Ethernet and industry-standard protocols, although other types or numbers of protocols or communication networks can be used. The communication network(s) in this example can employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

While the NTMD is illustrated in this example as including a single device, the NTMD in other examples can include a plurality of devices or blades each having one or more processors (each processor with one or more processing cores) that implement one or more steps of this technology. In these examples, one or more of the devices can have a dedicated communication interface or memory. Alternatively, one or more of the devices can utilize the memory, communication interface, or other hardware or software components of one or more other devices included in the network traffic management.

Additionally, one or more of the devices that together comprise the network traffic management in other examples can be standalone devices or integrated with one or more other devices or apparatuses, such as one or more server devices, for example. Moreover, one or more of the devices of the NTMD in these examples can be in a same or a different communication network including one or more public, private, or cloud networks, for example.

Although NTMD is illustrated as single device, one or more actions of each of the NTMD may be distributed across one or more distinct network computing devices that together comprise one or more of the NTMDs. Moreover, the NTMD is not limited to a particular configuration. Thus, the NTMD may contain network computing devices that operate using a master/slave approach, whereby one of the network computing devices of the NTMD operate to manage or otherwise coordinate operations of the other network computing devices. The NTMD may operate as a plurality of network computing devices within a cluster architecture, a peer-to peer architecture, virtual machines, or within a cloud architecture, for example.

Thus, the technology disclosed herein is not to be construed as being limited to a single environment and other configurations and architectures are also envisaged. For example, in some embodiments, one or more of the modules of the NTMD may be an integrated software component of an a device such as an NTMD or SCP. In some embodiments, one or more of the modules of the NTMD may be run as a separate container in a cloud-based deployment and may interact with the NTMD, SCP or any other proxy. In some embodiments, the one or modules of the NTMD may be implemented in a separate device that is positioned in front of the NTMD/SCP/other proxy in the network. In some embodiments, one or more of the NTMD modules described herein may be part of a non-standard NF load balancer/proxy.

The user equipment (UE) devices of the 5G network architecture in this example include any type of computing device that can exchange network data, such as mobile, desktop, laptop, or tablet computing devices, virtual machines (including cloud-based computers), or the like. Each of the UE devices includes a processor, a memory, and a communication interface, which are coupled together by a bus or other communication link (not illustrated), although other numbers or types of components could also be used.

The UE devices may run interface applications, such as standard web browsers or standalone client applications. The interface applications may provide an interface to make requests for, and receive content stored on, one or more of server devices that are part of the data network (DN). The UE devices may further include a display device, such as a display screen or touchscreen, or an input device, such as a keyboard for example (not illustrated).

Although the exemplary 5G system architecture with NTMD, UE device, R(AN), DN and various NFs are described and illustrated herein, other types or numbers of systems, devices, components, or elements in other topologies can be used. It is to be understood that the systems of the examples described herein are for exemplary purposes, as many variations of the specific hardware and software used to implement the examples are possible, as will be appreciated by those skilled in the relevant art(s).

One or more of the components depicted in the 5G system architecture, such as the NTMD and various NFs, for example, may be configured to operate as virtual instances on the same physical machine. In other words, one or more of the NTMD and various NFs may operate on the same physical device rather than as separate devices communicating through communication network(s). Additionally, there may be more or fewer NTMDs or instances of various NFs than illustrated in FIGS. 2A-2B.

In addition, two or more computing systems or devices can be substituted for any one of the systems or devices in any example. Accordingly, principles and advantages of distributed processing, such as redundancy and replication also can be implemented, as desired, to increase the robustness and performance of the devices and systems of the examples. The examples may also be implemented on computer system(s) that extend across any suitable network using any suitable interface mechanisms and traffic technologies, including by way of example only, wireless traffic networks, cellular traffic networks, Packet Data Networks (PDNs), the Internet, intranets, and combinations thereof.

The examples also may be embodied as one or more non-transitory computer readable media having instructions stored thereon, such as in the memory of the NTMD, for one or more aspects of the present technology, as described and illustrated by way of the examples herein. The instructions in some examples include executable code that, when executed by one or more processors, such as the processor(s) of the NTMD may cause the processors to carry out steps necessary to implement the methods of the examples of this technology that are described and illustrated herein.

An exemplary method of providing efficient overload protection in 5G core networks will be described with reference to FIGS. 1-5. Referring more specifically to FIG. 5, a flow diagram of an example method 500 of providing efficient overload protection in 5G core networks is illustrated. In step 502 in this example, the NTMD may monitor a load at a producer network function (NF). For example, as described previously above with respect to FIG. 3, the NTMD may include a load monitoring module that allows it to monitor loads on one or more producer NFs (e.g., by parsing SBA responses from a producer NF). According to some embodiments, the NTMD may be a service communication proxy (SCP) device that has been modified to perform the functions described herein.

In step 504, the NTMD may, in response to determining that the producer NF is overloaded, monitor a plurality of types of network traffic flowing to the overloaded producer NF (e.g., using an overload identification module as described above with respect to FIG. 3). Each of the plurality of types of network traffic may correspond to network traffic associated with a different event type of a plurality of event types.

According to some embodiments, the method may include determining that the producer NF is overloaded in response to determining that the load on the producer NF exceeds a predetermined threshold load.

According to some embodiments, the plurality of event types may include two or more of: a create session event type; a release session event type; an Xn handover event type; an N2 handover event type; a 4G to 5G handover event type; a WLAN to 5G handover event type; a UE requested session modification event type; a UE requested idle to active event type; or a RAN requested active to idle event type.

In step 506, the NTMD may identify an overloaded network traffic type. An overloaded network traffic type may be a type of network traffic of the plurality of types of network traffic flowing to the producer NF that includes an amount of network traffic that exceeds a first threshold amount above a first baseline amount of network traffic.

According to some embodiments, the first baseline amount of network traffic may be a maximum aggregate amount of network traffic of the overloaded network traffic type that is expected to flow to the producer NF under normal operation during a first specified time period. In other embodiments, the first baseline amount may be an average of a range of network traffic of the overloaded network traffic type that is expected to flow to the producer NF under normal operation during a first specified time period. According to some embodiments, the range of normal or expected traffic for a given type of traffic may be determined using historical data or by modeling the system.

In step 508, the NTMD may identify an overloaded session. The overloaded session may be one session of a plurality of sessions that are active on/connected to the producer NF. The overloaded session may be a session including an amount of network traffic of the overloaded network traffic type that exceeds a second threshold amount above a second baseline amount of network traffic.

According to some embodiments, the second baseline amount of network traffic may be a maximum amount of network traffic of the overloaded network traffic type that is expected to flow to the producer NF under normal operation in association with a single session during a second specified time period. According to some embodiments, the first and second specified time periods may be the same.

In step 510, the NTMD may perform a mitigating action to reduce network traffic from the identified overloaded session. For example, as described previously above, the identified overloaded session may be placed into one of a plurality of predefined mitigation categories based on the degree of excess network traffic being caused by the identified overloaded session. Each category of the predefined mitigation categories may have associated mitigation actions, such as for example but not limited to, rate limiting requests of the session, rejecting requests and/or messages of the session and providing error codes to upstream consumer NFs to allow the consumer NFs to take further mitigating actions with respect to the identified overloaded session.

According to some embodiments, the method may further include obtaining a user equipment (UE) identifier from data associated with the identified overloaded session and identifying a user equipment device associated with the session. In some embodiments, a UE identifier may include a subscription permanent identifier (SUPI) and/or an IP address associated with the UE. By identifying the UE device associated with one or more overloaded sessions, the system can target mitigating actions to a particular device that is a cause of the overloaded producer NF. Thus, in some embodiments, performing the mitigating action may include reducing network traffic from the identified UE device.

With this technology, providing efficient overload protection within a 5G core network can be achieved. The system can advantageously identify particular sessions/UEs that are acting as primary causes of a network traffic overload at a producer NF and take mitigating actions against only those identified sessions/UEs. As such, the system can provide an efficient way to protect against overloads by only targeting the faulty/bad actors, which can provide a quick resolution to the overload condition. Further, throttling sessions/UEs that are not a cause for the overload can be avoided, thereby allowing for innocent (i.e., non-overload causing) users to avoid punishment (e.g., throttling) for the behavior of others. Furthermore, the system can also advantageously be used to diagnose system design errors and problems with particular nodes or devices that may be unknowingly causing overloads such that such issues can be addressed and fixed.

Having thus described the basic concept of the invention, it will be rather apparent to those skilled in the art that the foregoing detailed disclosure is intended to be presented by way of example only and is not limiting. Various alterations, improvements, and modifications will occur and are intended to those skilled in the art, though not expressly stated herein. These alterations, improvements, and modifications are intended to be suggested hereby, and are within the spirit and scope of the invention. Additionally, the recited order of processing elements or sequences, or the use of numbers, letters, or other designations therefore, is not intended to limit the claimed processes to any order except as may be specified in the claims. Accordingly, the invention is limited only by the following claims and equivalents thereto.

What is claimed is:

1. A method implemented by a network traffic management system comprising one or more network traffic management devices and network functions (NFs), the method comprising:

monitoring a load at a producer NF;

responsive to determining that the producer NF is overloaded, monitoring a plurality of types of network traffic flowing to the overloaded producer NF, wherein each of the plurality of types of network traffic corresponds to network traffic associated with a different event type of a plurality of event types;

identifying an overloaded network traffic type, wherein the overloaded network traffic type comprises a type of network traffic of the plurality of types of network traffic flowing to the producer NF that comprises an amount of network traffic that exceeds a first threshold amount above a first baseline amount of network traffic;

identifying an overloaded session, wherein the overloaded session comprises a session comprising an amount of network traffic of the overloaded network traffic type that exceeds a second threshold amount above a second baseline amount of network traffic; and performing a mitigating action to reduce network traffic from the identified overloaded session.

2. The method of claim 1, further comprising:

obtaining, from data associated with the identified overloaded session, a user equipment (UE) identifier; and identifying, based on the user equipment identifier, a user equipment device associated with the session;

wherein performing a mitigating action to reduce network traffic from the identified overloaded session comprises reducing network traffic from the identified user equipment device.

3. The method of claim 1, wherein the plurality of event types comprises two or more of:

a create session event type;

a release session event type;

an Xn handover event type;

an N2 handover event type;

a 4G to 5G handover event type;

a WLAN to 5G handover event type;

a UE requested session modification event type;

a UE requested idle to active event type; or a RAN requested active to idle event type.

4. The method of claim 1, wherein the first baseline amount of network traffic comprises a maximum aggregate amount of network traffic of the overloaded network traffic type that is expected to flow to the producer NF under normal operation during a first specified time period and the second baseline amount of network traffic comprises a maximum amount of network traffic of the overloaded network traffic type that is expected to flow to the producer NF under normal operation in association with a single session during a second specified time period.

5. The method of claim 1, further comprising:

determining that the producer NF is overloaded in response to determining that the load on the producer NF exceeds a predetermined threshold load;

wherein the monitoring a load at the producer NF comprises parsing SBA responses from the producer NF.

6. A network traffic management device, comprising memory comprising programmed instructions stored thereon and one or more processors configured to be capable of executing the stored programmed instructions to:

monitor a load at a producer network function (NF);

responsive to determining that the producer NF is overloaded, monitor a plurality of types of network traffic flowing to the overloaded producer NF, wherein each of the plurality of types of network traffic corresponds to network traffic associated with a different event type of a plurality of event types;

identify an overloaded network traffic type, wherein the overloaded network traffic type comprises a type of network traffic of the plurality of types of network traffic flowing to the producer NF that comprises an amount of network traffic that exceeds a first threshold amount above a first baseline amount of network traffic;

identify an overloaded session, wherein the overloaded session comprises a session comprising an amount of network traffic of the overloaded network traffic type that exceeds a second threshold amount above a second baseline amount of network traffic; and perform a mitigating action to reduce network traffic from the identified overloaded session.

7. The device of claim 6, wherein the one or more processors are further configured to be capable of executing the stored programmed instructions to:

obtain, from data associated with the identified overloaded session, a user equipment (UE) identifier; and identify, based on the user equipment identifier, a user equipment device associated with the session;

wherein the performing a mitigating action to reduce network traffic from the identified overloaded session comprises reducing network traffic from the identified user equipment device.

8. The device of claim 6, wherein the plurality of event types comprises two or more of:

a create session event type;

a release session event type;

an Xn handover event type;

an N2 handover event type;

a 4G to 5G handover event type;

a WLAN to 5G handover event type;

a UE requested session modification event type;

a UE requested idle to active event type; or a RAN requested active to idle event type.

9. The device of claim 6, wherein the first baseline amount of network traffic comprises a maximum aggregate amount of network traffic of the overloaded network traffic type that is expected to flow to the producer NF under normal operation during a first specified time period and the second baseline amount of network traffic comprises a maximum amount of network traffic of the overloaded network traffic type that is expected to flow to the producer NF under normal operation in association with a single session during a second specified time period.

10. The device of claim 6, wherein the one or more processors are further configured to be capable of executing the stored programmed instructions to:

determine that the producer NF is overloaded in response to determining that the load on the producer NF exceeds a predetermined threshold load;

wherein the monitoring a load at the producer NF comprises parsing SBA responses from the producer NF.

11. A non-transitory computer readable medium having stored thereon instructions comprising executable code that, when executed by one or more processors, causes the one or more processors to:

monitor a load at a producer network function (NF);

responsive to determining that the producer NF is overloaded, monitor a plurality of types of network traffic flowing to the overloaded producer NF, wherein each of the plurality of types of network traffic corresponds to network traffic associated with a different event type of a plurality of event types;

identify an overloaded network traffic type, wherein the overloaded network traffic type comprises a type of network traffic of the plurality of types of network traffic flowing to the producer NF that comprises an amount of network traffic that exceeds a first threshold amount above a first baseline amount of network traffic;

identify an overloaded session, wherein the overloaded session comprises a session comprising an amount of network traffic of the overloaded network traffic type that exceeds a second threshold amount above a second baseline amount of network traffic; and perform a mitigating action to reduce network traffic from the identified overloaded session.

12. The non-transitory computer readable medium of claim 11 comprising further instructions that, when executed by the one or more processors, causes the one or more processors to:

obtain, from data associated with the identified overloaded session, a user equipment (UE) identifier; and identify, based on the user equipment identifier, a user equipment device associated with the session;

wherein the performing a mitigating action to reduce network traffic from the identified overloaded session comprises reducing network traffic from the identified user equipment device.

13. The non-transitory computer readable medium of claim 11, wherein the plurality of event types comprises two or more of:

a create session event type;

a release session event type;

an Xn handover event type;

an N2 handover event type;

a 4G to 5G handover event type;

a WLAN to 5G handover event type;

a UE requested session modification event type;

a UE requested idle to active event type; or a RAN requested active to idle event type.

14. The non-transitory computer readable medium of claim 11, wherein the first baseline amount of network traffic comprises a maximum aggregate amount of network traffic of the overloaded network traffic type that is expected to flow to the producer NF under normal operation during a first specified time period and the second baseline amount of network traffic comprises a maximum amount of network traffic of the overloaded network traffic type that is expected to flow to the producer NF under normal operation in association with a single session during a second specified time period.

15. The non-transitory computer readable medium of claim 11 comprising further instructions that, when executed by the one or more processors, causes the one or more processors to:

determine that the producer NF is overloaded in response to determining that the load on the producer NF exceeds a predetermined threshold load;

wherein the monitoring a load at the producer NF comprises parsing SBA responses from the producer NF.

16. A network traffic management system, comprising one or more network traffic management devices and network functions (NFs) with memory comprising programmed instructions stored thereon and one or more processors configured to be capable of executing the stored programmed instructions to:

monitor a load at a producer NF;

responsive to determining that the producer NF is overloaded, monitor a plurality of types of network traffic flowing to the overloaded producer NF, wherein each of the plurality of types of network traffic corresponds to network traffic associated with a different event type of a plurality of event types;

identify an overloaded network traffic type, wherein the overloaded network traffic type comprises a type of network traffic of the plurality of types of network traffic flowing to the producer NF that comprises an amount of network traffic that exceeds a first threshold amount above a first baseline amount of network traffic;

identify an overloaded session, wherein the overloaded session comprises a session comprising an amount of network traffic of the overloaded network traffic type that exceeds a second threshold amount above a second baseline amount of network traffic; and perform a mitigating action to reduce network traffic from the identified overloaded session.

17. The system of claim 16, wherein the one or more processors are further configured to be capable of executing the stored programmed instructions to:

obtain, from data associated with the identified overloaded session, a user equipment (UE) identifier; and identify, based on the user equipment identifier, a user equipment device associated with the session;

wherein the performing a mitigating action to reduce network traffic from the identified overloaded session comprises reducing network traffic from the identified user equipment device.

18. The system of claim 17, wherein the plurality of event types comprises two or more of:

a create session event type;

a release session event type;

an Xn handover event type;

an N2 handover event type;

a 4G to 5G handover event type;

a WLAN to 5G handover event type;

a UE requested session modification event type;

a UE requested idle to active event type; or a RAN requested active to idle event type.

19. The system of claim 18, wherein the first baseline amount of network traffic comprises a maximum aggregate amount of network traffic of the overloaded network traffic type that is expected to flow to the producer NF under normal operation during a first specified time period and the second baseline amount of network traffic comprises a maximum amount of network traffic of the overloaded network traffic type that is expected to flow to the producer NF under normal operation in association with a single session during a second specified time period.

20. The system of claim 16, wherein the one or more processors are further configured to be capable of executing the stored programmed instructions to:

determine that the producer NF is overloaded in response to determining that the load on the producer NF exceeds a predetermined threshold load;

wherein the monitoring a load at the producer NF comprises parsing SBA responses from the producer NF.

\* \* \* \* \*